(12) United States Patent
Faircloth

(10) Patent No.: US 7,455,266 B2
(45) Date of Patent: Nov. 25, 2008

(54) ELECTRICAL CONDUIT SUPPORT APPARATUS

(76) Inventor: Franklin J. Faircloth, 1749 Duke Rd., Longs, SC (US) 29568

( * ) Notice: Subject to any disclaimer, the term of this patent is extended or adjusted under 35 U.S.C. 154(b) by 85 days.

(21) Appl. No.: 11/522,073

(22) Filed: Sep. 15, 2006

(65) Prior Publication Data

US 2008/0078909 A1 Apr. 3, 2008

(51) Int. Cl.
F16L 5/00 (2006.01)
(52) U.S. Cl. .............. 248/57; 248/56; 248/58; 248/300; 248/906
(58) Field of Classification Search ......... 248/906, 248/300, 56, 57, 27.1, 58; 52/27
See application file for complete search history.

(56) References Cited

U.S. PATENT DOCUMENTS

| | | | |
|---|---|---|---|
| 2,761,640 A * | 9/1956 | Frater | 248/496 |
| 3,038,020 A * | 6/1962 | Winter et al. | 174/53 |
| 3,592,427 A | 7/1971 | Misuraca | |
| 4,560,126 A | 12/1985 | Judkins et al. | |
| 4,971,272 A | 11/1990 | Gudridge et al. | |
| 5,060,891 A | 10/1991 | Nagy et al. | |
| 5,060,892 A * | 10/1991 | Dougherty | 248/57 |
| 5,303,887 A | 4/1994 | Hasty | |
| 5,698,820 A | 12/1997 | Collard | |
| 5,931,423 A | 8/1999 | Heideloff | |
| 5,971,329 A | 10/1999 | Hickey | |
| 5,987,706 A | 11/1999 | Boe | |
| 6,209,836 B1 * | 4/2001 | Swanson | 248/300 |
| 6,238,243 B1 * | 5/2001 | Lorenz et al. | 439/553 |
| 6,250,591 B1 | 6/2001 | Cunningham | |
| 6,388,192 B1 * | 5/2002 | Layne | 174/58 |
| 6,513,765 B2 | 2/2003 | Griffin et al. | |
| 7,014,152 B2 | 3/2006 | Grendahl | |
| 7,271,335 B2 * | 9/2007 | Dinh | 174/58 |
| 7,271,336 B2 * | 9/2007 | Dinh | 174/58 |
| 2002/0104942 A1 * | 8/2002 | Mimlitch et al. | 248/300 |
| 2005/0127256 A1 * | 6/2005 | Johnson et al. | 248/205.1 |

* cited by examiner

*Primary Examiner*—Amy J. Sterling
(74) *Attorney, Agent, or Firm*—P. Jeff Martin; The McGougan Law Firm, LLC

(57) ABSTRACT

An electrical conduit support apparatus is provided and adapted to accommodate and support vertically at least two electrical conduits within a masonry block such that the lengthwise dimensions of conduits are installed parallel and spatially-positioned in accordance to industry standards for electrical conduit installation. The electrical conduit support apparatus is further configured to maintain an electrical or receptacle box in a fixed position.

16 Claims, 3 Drawing Sheets

ELECTRICAL CONDUIT SUPPORT APPARATUS

RELATED APPLICATIONS

The present invention was first described in Disclosure Document No. 603,638 filed on Jul. 18, 2006 under 35 U.S.C. §122, 37 C.F.R. §1.14, and MPEP §1706. There are no previously filed, nor currently any co-pending applications, anywhere in the world.

BACKGROUND OF THE INVENTION

1. Field of the Invention

The present invention relates generally to conduit supports and, more particularly, to an electrical conduit support apparatus for maintaining a receptacle box in position.

2. Description of the Related Art

In the construction industry, electrical conduit is commonly utilized to effectively and safely deliver electricity to different areas of a building. In many instances, conduit is run underground for connection with electrical installations located inside and outside of buildings, and particularly for connection to aboveground electrical boxes. Installation in which electrical conduit is connected to electrical boxes requires that the conduit be integrated and spatially-positioned in accordance to industry standards for electrical conduit installation.

Accordingly, a need has arisen for an improved electrical conduit support apparatus adapted to accommodate and support vertically at least two electrical conduits within a masonry block such that the lengthwise dimensions of the conduits are installed parallel and spatially-positioned in accordance to industry standards for electrical conduit installation, and which is adapted to maintain an electrical or receptacle box in a fixed position in a manner which is quick, easy, and efficient. The development of the electrical conduit support apparatus fulfills this need.

A search of the prior art did not disclose any patents that read directly on the claims of the instant invention; however, the following references were considered related.

The following patents disclose various conduit support devices and mechanisms:

U.S. Pat. No. 7,014,152 B2, issued in the name of Grendahl;

U.S. Pat. No. 6,513,765 B2, issued in the name of Griffin et al.;

U.S. Pat. No. 6,250,591, issued in the name of Cunningham;

U.S. Pat. No. 5,987,706, issued in the name of Boe;

U.S. Pat. No. 5,971,329, issued in the name of Hickey;

U.S. Pat. No. 5,931,423, issued in the name of Heideloff;

U.S. Pat. No. 5,698,820, issued in the name of Collard;

U.S. Pat. No. 5,303,887, issued in the name of Hasty et al.;

U.S. Pat. No. 5,060,891, issued in the name of Nagy et al.;

U.S. Pat. No. 4,971,272, issued in the name of Gudridge et al.;

U.S. Pat. No. 4,560,126, issued in the name of Judkins et al.; and

U.S. Pat. No. 3,592,427, issued in the name of Misuraca.

Consequently, a need has been felt for an electrical conduit support apparatus adapted to accommodate and support vertically at least two electrical conduits within masonry block such that the lengthwise dimensions of conduits are installed parallel and spatially-positioned in accordance to industry standards for electrical conduit installation, and which is adapted to maintain an electrical or receptacle box in place in a manner which is quick, easy, and efficient.

SUMMARY OF THE INVENTION

Therefore, it is an object of the present invention to provide an electrical conduit support apparatus adapted to accommodate and support vertically at least two electrical conduits within a masonry block such that the lengthwise dimensions thereof are installed parallel and spatially-positioned in accordance to industry standards for electrical conduit installation.

It is another object of the present invention to provide an electrical conduit support apparatus adapted to maintain an electrical or receptacle box in a fixed position.

It is another object of the present invention to provide a main body having a plurality of alignment apertures which are spatially-positioned in accordance to industry standards for electrical conduit installation.

It is another object of the present invention to provide alignment apertures that may be sized so as to accommodate electrical conduit of various diametric measures.

It is another object of the present invention to provide deformable tabs adapted to facilitate securement of the electrical conduit support apparatus atop masonry block.

It is still another object of the present invention to provide a plurality of bosses adapted and configured to frictionally engage an inner surface of a masonry block so as to secure electrical conduit support apparatus thereagainst via mechanical interference.

It is another object of the present invention to provide a lightweight, rigid device constructed from sheet metal or galvanized sheet metal.

Briefly described according to one embodiment of the present invention, an electrical conduit support apparatus is disclosed. The conduit support apparatus is adapted to accommodate and support vertically at least two electrical conduits within a masonry block such that the lengthwise dimensions thereof are installed parallel and spatially-positioned in accordance to industry standards for electrical conduit installation. The conduit support apparatus is further adapted to maintain an electrical or receptacle box in position. The conduit support apparatus is further adapted to facilitate easy installation of electrical conduit to an electrical or receptacle box.

The conduit support apparatus comprises a main body defined of a smooth, planar plate having a top face and a bottom face. The main body includes a plurality of alignment apertures defined therein, wherein alignment apertures are spatially-positioned in accordance to industry standards for electrical conduit installation. The alignment apertures are sized and dimensioned to accommodate electrical conduits. The alignment apertures may be sized so as to accommodate electrical conduit of various diametric measures.

The top face and bottom face of planar plate are bounded by a longitudinal straight edge, a left vertical edge member, a right vertical edge member and a rear vertical edge member. Planar plate and left vertical edge member are integrally connected at a first interface, wherein planar plate and left vertical edge member are disposed at a right angle. Planar plate and rear vertical edge member are integrally connected at a rear interface, wherein planar plate and rear vertical edge member are disposed at a right angle. Planar plate and right vertical edge member are integrally connected at a second interface, wherein planar plate and right vertical edge member are disposed at a right angle.

The left vertical edge member includes an upper surface from which a brace or first horizontal support plate extends perpendicularly therefrom a longitudinal distance. The right vertical edge member includes an upper surface from which a brace or second horizontal support plate extends perpendicularly therefrom a longitudinal distance. Second horizontal support plate extends oppositionally with respect to first horizontal support plate. The rear vertical edge member includes an upper surface from which a brace or rear horizontal support plate extends perpendicularly therefrom a longitudinal distance.

During use, the present invention is overlaid atop masonry block in a manner such that the lower surface of first horizontal support plate, the lower surface of second horizontal support plate, and the lower surface of rear horizontal support plate are snugly engaged against an upper surface of vertical walls of masonry block. In addition, an outer surface of the left vertical edge member and an outer surface of the right vertical edge member are snugly engaged against an inner surface of vertical walls of masonry block. The planar plate portion of the present invention resides in a slightly recessed position within the hollow cavity of masonry block.

The rear horizontal support plate includes an apparatus restraining means, or a plurality of deformable tabs formed integral therewith along an upper straight edge portion of rear horizontal support plate. The deformable tabs, which in a first position, extend longitudinally in a direction distal to rear vertical edge member and are planar with rear horizontal support plate. The deformable tabs are deformable from the first position to a second position which is perpendicular to the upper surface of the rear horizontal support plate. Thus, the deformable tabs and the rear horizontal support plate are disposed at a right angle when tabs are deformed to the second position.

The plurality of deformable tabs each includes an upper surface and a lower surface. The lower surface or masonry block engagement surface snugly contacts the outer surface of first horizontal wall of the masonry block, thereby facilitating securement of electrical conduit support apparatus atop masonry block.

A plurality of abutment elements or bosses is provided which protrude integrally and perpendicularly from an outer sidewall of the rear vertical edge member. The bosses flank the rear horizontal support plate. Each boss includes an anterior end and a posterior end, wherein anterior end tapers substantially toward posterior end so as to form a pointed tip thereat. The pointed tip is adapted and configured to frictionally engage an inner surface of first longitudinal wall within hollow cavity of masonry block so as to secure electrical conduit support apparatus thereagainst via mechanical interference.

The electrical conduit support apparatus is constructed from anyone of a variety of metals which includes but is not limited to sheet metal or galvanized sheet metal. It is contemplated that the electrical conduit support apparatus may also be constructed from various suitably rigid, yet deformable plastics, polymers, or metallic-plastic composites.

The use of the present invention allows for electrical conduit to be supported vertically within a masonry block such that the lengthwise dimensions thereof are installed parallel and spatially-positioned in accordance to industry standards in a manner which is quick, easy, and efficient.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

Detailed Description of the Figures

Figure 1:
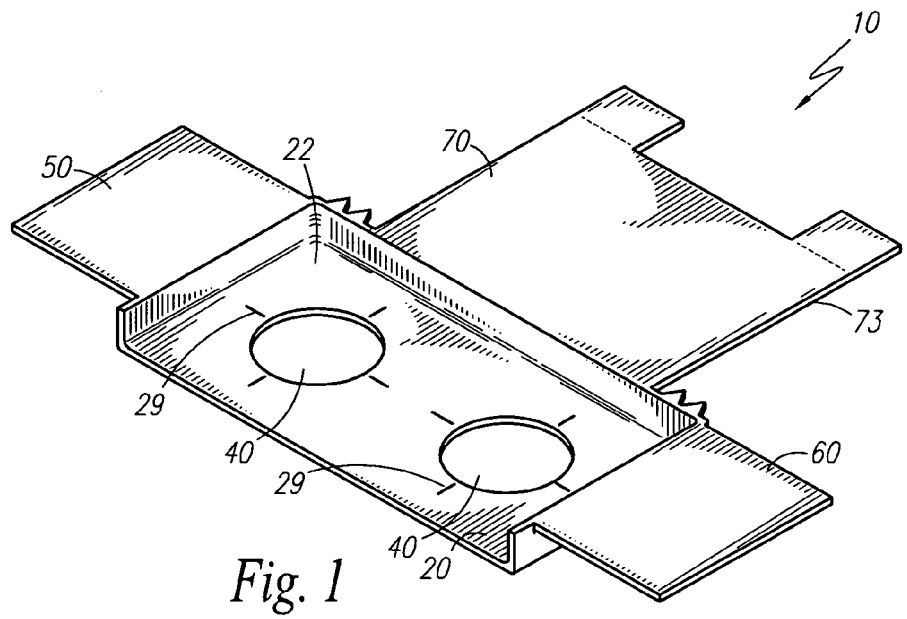
FIG. 1 is a perspective view of an electrical conduit support apparatus, according to the preferred embodiment of the present invention.
Figure 2:
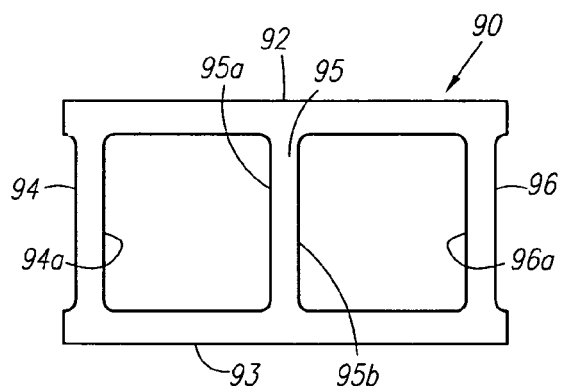
FIG. 2 is a top plan view of a masonry block.
Figure 3:
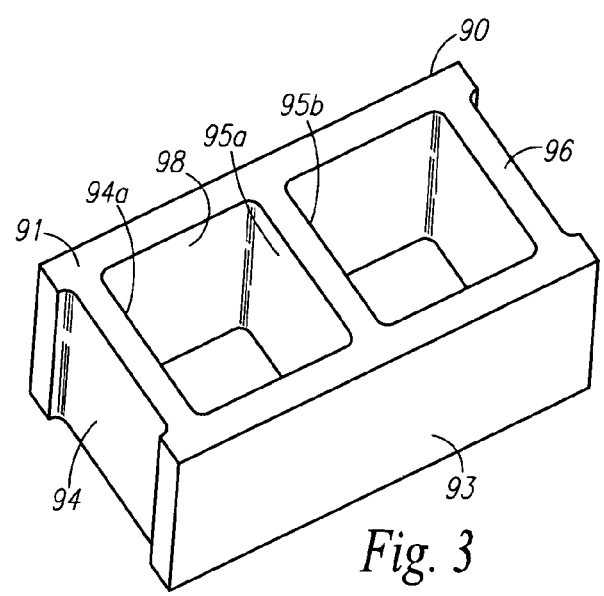
FIG. 3 is a perspective view of a masonry block.
Figure 4:
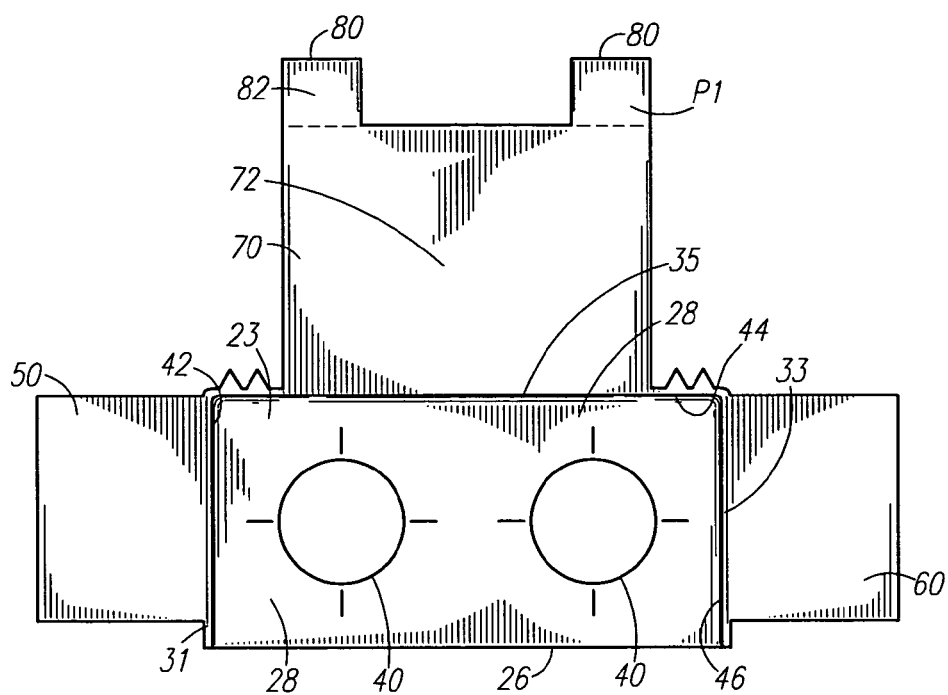
FIG. 4 is a top plan view of the electrical conduit support apparatus, according to the preferred embodiment of the present invention.

Referring now to FIGS. 1-7 and 10, an electrical conduit support apparatus 10 is shown, according to the present invention, adapted to accommodate and support vertically at least two electrical conduits 15 within a masonry block 90 such that the lengthwise dimensions thereof are installed parallel and spatially-positioned in accordance to industry standards for electrical conduit 15 installation. The electrical conduit support apparatus 10 is further adapted to facilitate easy installation of electrical conduit 15 to an electrical or receptacle box 110, thereby maintaining the electrical box 110 in a fixed position. For purposes of this disclosure, a masonry block 90 is a rectangular block or brick used in construction. Masonry block 90 generally has the shape of two squares joined on one side to form a unitary rectangular shape, wherein the central portions of the two squares are hollow so as to form a pair of generally, square-shaped cavities 98. Masonry block includes a first longitudinal wall 92 and a second longitudinal wall 93. Masonry block 90 includes cinder blocks and concrete blocks. Cinder blocks are made from coal cinders and concrete, whereas concrete blocks are made from pure concrete.

Referring now more specifically to FIGS. 1-7, the electrical conduit support apparatus 10 is comprised of a main body 20 defined of a smooth, planar plate 22 having a top face 23 and a bottom face 24. The main body 20 is further comprised of a plurality of alignment apertures 40 defined therein, wherein alignment apertures 40 are spatially-positioned in accordance to industry standards for electrical conduit 15 installation.

The main body 20 includes a spacer zone 28 and centerline fillisters 29. The plurality of alignment apertures 40 are shown herein as circular and of an equal size, although it is contemplated that alignment apertures 40 may be of different and various sizes and of other shapes. The alignment apertures 40 are sized and dimensioned to accommodate electrical conduits 15. For example, alignment apertures 40 may each be sized to accommodate 0.75, 1.00, 1.25, 1.50, 2.00, 2.50, 3.00, 3.50, 4.00, 4.25, and 4.50 inch diameter electrical conduit 15. The plurality of alignment apertures 40 are spaced from first, second, and rear interface 42, 46, and 44, respectively, by the spacer zone 28. Spacer zone 28 extends along a horizontal length of rear interface 42 and along a vertical length of both first interface 42 and second interface 46 on the top face 23 of main body 20.

Top face 23 and bottom face 24 of planar plate 22 are bounded by a longitudinal straight edge 26, a left vertical edge member 30, a right vertical edge member 32 and a rear vertical edge member 34. Planar plate 22 and left vertical edge member 30 are integrally connected at a first interface 42, wherein planar plate 22 and left vertical edge member 30 are disposed at a right angle. Planar plate 22 and rear vertical edge member 34 are integrally connected at a rear interface 44, wherein planar plate 22 and rear vertical edge member 34 are disposed at a right angle. Planar plate 22 and right vertical edge member 32 are integrally connected at a second interface 46, wherein planar plate 22 and right vertical edge member 32 are disposed at a right angle.

Left vertical edge member 30 includes an upper surface 31 from which a brace or first horizontal support plate 50 extends perpendicularly therefrom a longitudinal distance. The left vertical edge member 30 and first horizontal support plate 50 are disposed at a right angle. First horizontal support plate 50 is defined generally as having a smooth, rectangular configuration with an upper and lower surface 52, 53, respectively, wherein lower surface 53 functions as a masonry block contacting surface 56.

Right vertical edge member 32 includes an upper surface 33 from which a brace or second horizontal support plate 60 extends perpendicularly therefrom a longitudinal distance. The right vertical edge member 32 and second horizontal support plate 60 are disposed at a right angle. Second horizontal support plate 60 is defined generally as having a smooth, rectangular configuration with an upper and lower surface 62, 63, respectively, wherein lower surface 63 functions as a masonry block contacting surface 66. Second horizontal support plate 60 extends oppositionally with respect to first horizontal support plate 50.

Figure 7:
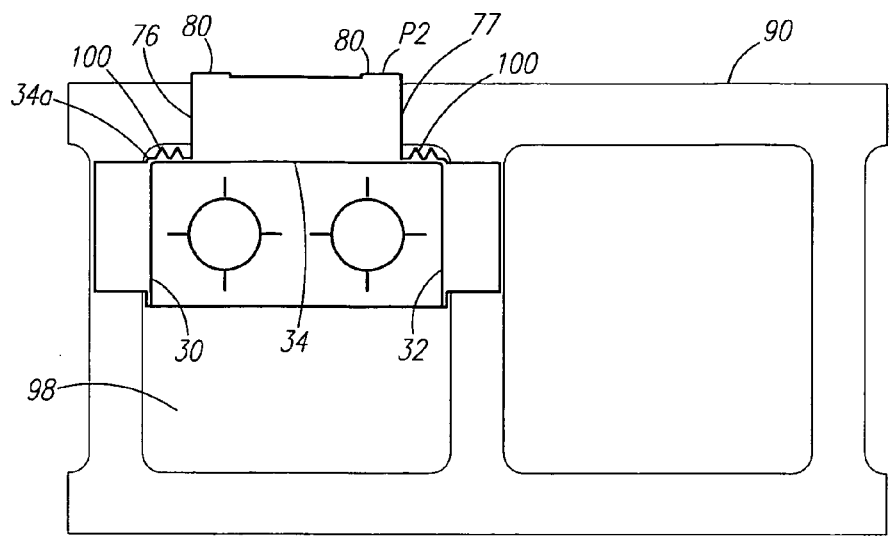
FIG. 7 is a top plan view of the present invention shown secured atop a masonry block, according to the preferred embodiment thereof.
Figure 8:
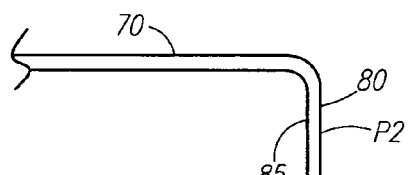
FIG. 8 is a side elevational view of the rear horizontal support plate and deformable tab, wherein deformable tab is shown deformed to a second position, according to the preferred embodiment of the present invention.
Figure 10:
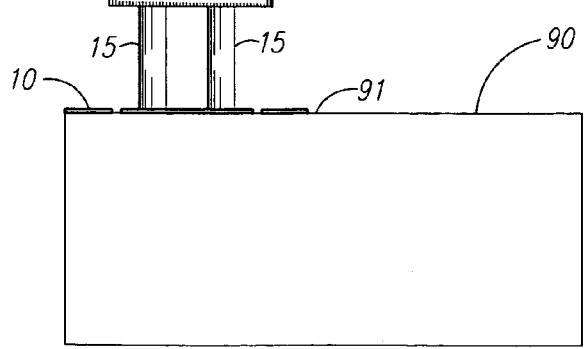
FIG. 10 is a frontal perspective view of the electrical conduit support apparatus shown connected to an electrical box, according to the preferred embodiment of the present invention.

Rear vertical edge member 34 includes an upper surface 35 from which a brace or rear horizontal support plate 70 extends perpendicularly therefrom a longitudinal distance. The rear vertical edge member 34 and rear horizontal support plate 70 are disposed at a right angle. Rear horizontal support plate 70 is defined generally as having a smooth, rectangular configuration with an upper and lower surface 72, 73, respectively, wherein lower surface 73 functions as a masonry block contacting surface 79. Rear horizontal support plate 70 extends distally to alignment apertures 40. Thus during use, the present invention is overlaid atop masonry block 90 in a manner such that the lower surface 53 of first horizontal support plate 50, the lower surface 63 of second horizontal support plate 60, and the lower surface 73 of rear horizontal support plate 70 are adapted to be snugly engaged against an upper surface of vertical walls 94, 95 and first longitudinal wall 92, respectively of masonry block 90. In addition, an outer surface 30a of left vertical edge member 30 and an outer surface 32a of right vertical edge member 32 are adapted to be snugly engaged against an inner surface 94a and 95a of vertical walls 94 and 95, respectively. The planar plate 22 portion of apparatus 10 resides in a slightly recessed position within hollow cavity 98 of masonry block 90, wherein planar plate 22 is positioned just below an upper surface 91 thereof, as shown in FIGS. 7 and 10.

Alternatively, the present invention is overlaid atop masonry block 90 in a manner such that the lower surface 53 of first horizontal support plate 50, the lower surface 63 of second horizontal support plate 60, and the lower surface 73 of rear horizontal support plate 70 are adapted to be snugly engaged against an upper surface of vertical walls 95, 96 of masonry block 90. In addition, an outer surface 30a of left vertical edge member 30 and an outer surface 32a of right vertical edge member 32 are adapted to be snugly engaged against an inner surface 95b and 96a of vertical wall 95 and 96, respectively.

Referring now to FIGS. 4, 5, 7, and 8, the rear horizontal support plate 70 includes an apparatus restraining means, or a plurality of deformable tabs 80 formed integral therewith along an upper straight edge portion 75 thereof. The deformable tabs 80, which in a first position P1, extend longitudinally in a direction distal to rear vertical edge member 34 and are planar with rear horizontal support plate 70. Deformable tabs 80 are adapted to be deformed from the first position P1 to a second position P2 which is perpendicular to the upper surface 72 of rear horizontal support plate 70. Thus, deformable tabs 80 and rear horizontal support plate 70 are disposed at a right angle when tabs 80 are deformed to the second position P2.

The plurality of deformable tabs 80 each includes an upper surface 82 and a lower surface 83, wherein lower surface 83 functions as a masonry block engagement surface 85. More specifically, the lower surface 83 or masonry block engagement surface 85 snugly contacts the outer surface of first longitudinal wall 92 of the masonry block 90, thereby facilitating securement of electrical conduit support apparatus 10 atop masonry block 90.

Alternatively, it is envisioned that tabs 80 may be constructed so as to be integrally pre-molded to the second position P2, or more specifically, being perpendicular to the upper surface 72 of rear horizontal support plate 70.

Figure 5:
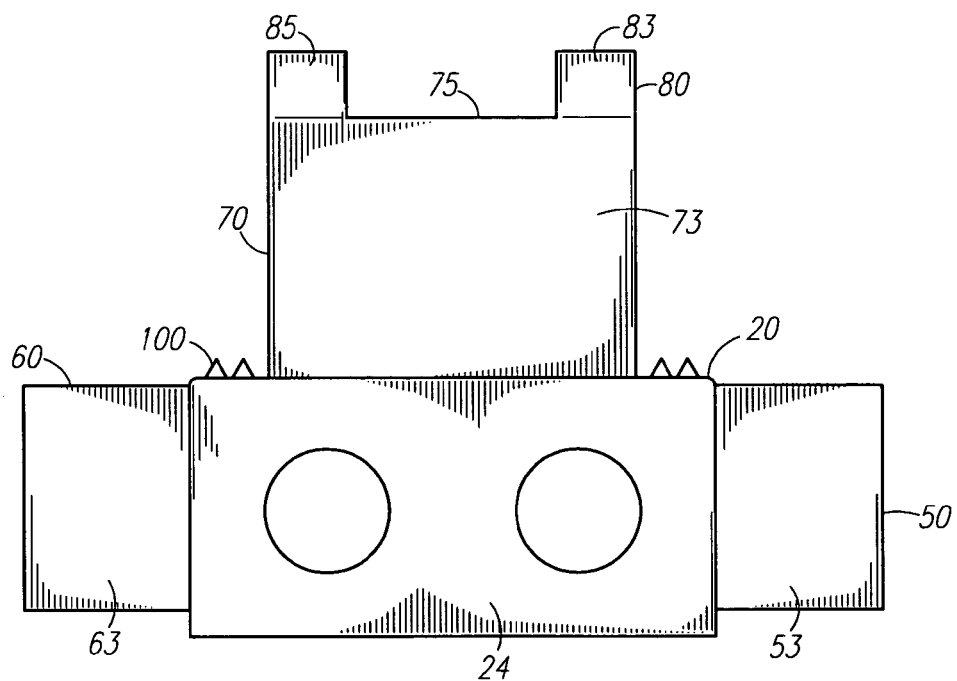
FIG. 5 is a bottom plan view thereof.
Figure 6:
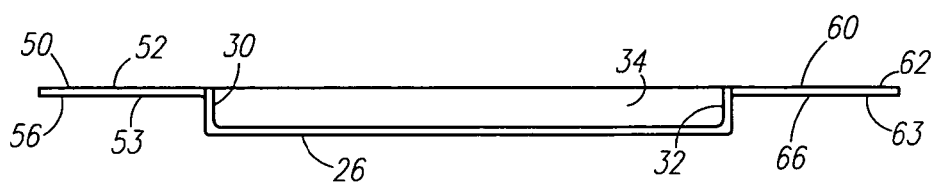
FIG. 6 is a front side elevational view of the electrical conduit support apparatus, according to the preferred embodiment of the present invention.
Figure 9:
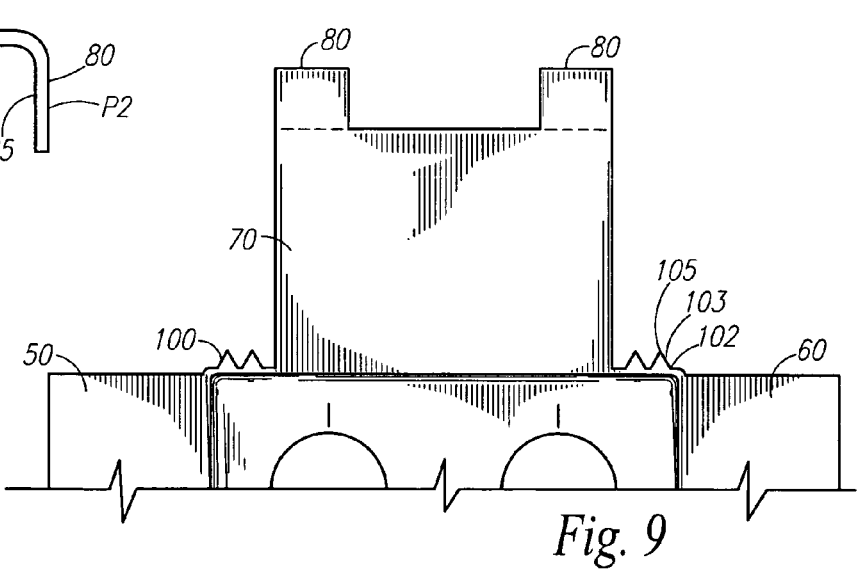
FIG. 9 is a partial top plan view of the electrical conduit support apparatus illustrating the bosses, according to the preferred embodiment of the present invention.

Referring now to FIGS. 5, 7, and 9, in order to further facilitate immobilization of the electrical conduit support apparatus 10 while engaged atop masonry block 90, a plurality of abutment elements or bosses 100 is provided. The bosses 100 integrally protrude perpendicularly from an outer sidewall 34a of rear vertical edge member 34. The bosses 100 flank each longitudinal straight edge 76, 77 of rear horizontal support plate 70. Each boss 100 includes an anterior end 102 and a posterior end 103, wherein anterior end 102 tapers substantially toward posterior end 103 so as to form a pointed tip 105 thereat. The pointed tip 105 is adapted and configured to frictionally engage an inner surface of first longitudinal wall 92 within hollow cavity 98 of masonry block 90 so as to secure electrical conduit support apparatus 10 thereagainst via mechanical interference.

The electrical conduit support apparatus 10 is constructed from anyone of a variety of metals which includes but is not limited to sheet metal or galvanized sheet metal. It is further contemplated that the present invention may be constructed from anyone of a variety of suitable rigid materials including but not limited to rigid deformable plastic, rigid deformable thermoplastic, polymers, or a metallic-plastic composite.

Operation of the Preferred Embodiment

To use the present invention, user lays the electrical conduit support apparatus 10 atop a masonry block 90 in a manner such that the lower surface 53 of first horizontal support plate 50, the lower surface 63 of second horizontal support plate 60, and the lower surface 73 of rear horizontal support plate 70 are snugly engaged against an upper surface of vertical walls 94, 95 of masonry block 90. In addition, and simultaneously, user snugly engages the outer surface 30a of left vertical edge member 30 and the outer surface 32a of right vertical edge member 32 against an inner surface 94a and 95a of vertical walls 94 and 95, respectively of masonry block 90. User next positions the apparatus 10 such that the bosses 100 are forcibly engaged against an inner surface of the first longitudinal wall 92 within hollow cavity 98 of masonry block 90. In this configuration, the planar plate 22 portion of apparatus 10 resides in a slightly recessed position within hollow cavity 98 of masonry block 90, wherein planar plate 22 is positioned just below an upper surface 91 thereof. Next, user bends deformable tabs 80 from the first position P1 to a second position P2 which is perpendicular to the upper surface 72 of rear horizontal support plate 70. Thus, deformable tabs 80 and rear horizontal support plate 70 are disposed at a right angle when tabs 80 are deformed to the second position P2. More specifically, the lower surface 83 or masonry block engagement surface 85 snugly contacts the outer surface of first longitudinal wall 92 of the masonry block 90, thereby facilitating securement of electrical conduit support apparatus 10 atop masonry block 90. Finally, user installs electrical conduit 15 within the alignment apertures 40.

The use of the present invention allows for electrical conduit to be supported vertically within a masonry block such that the lengthwise dimensions thereof are installed parallel and spatially-positioned in accordance to industry standards in a manner which is quick, easy, and efficient.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. A conduit support apparatus comprising:
a main body, said main body is defined of a smooth, planar plate having a top face and a bottom face, said main body includes a plurality of alignment apertures defined therein, wherein said alignment apertures are spatially-positioned in accordance to industry standards for electrical conduit installation, wherein said main body includes a spacer zone, centerline fillisters, a first interface, a second interface, and a rear interface, said spacer zone extends along a horizontal length of said rear interface and along a vertical length of both said first interface and said second interface on said top face of said planar plate, and wherein said alignment apertures are spaced from said first interface, said second interface, and said rear interface by said spacer zone, wherein said top face and said bottom face of said planar plate are bounded by a longitudinal straight edge, a left vertical edge member, a right vertical edge member and a rear vertical edge member, said planar plate and said left vertical edge member are integrally connected at said first interface, wherein said planar plate and said left vertical edge member are disposed at a right angle, said planar plate and said rear vertical edge member are integrally connected at said rear interface, wherein said planar plate and said rear vertical edge member are disposed at a right angle, said planar plate and said right vertical edge member are integrally connected at said second interface, wherein said planar plate and said right vertical edge member are disposed at a right angle, wherein said rear vertical edge member includes an upper surface from which a rear horizontal support plate extends perpendicularly therefrom a longitudinal distance, said rear vertical edge member and said rear horizontal support plate are disposed at a right angle, wherein said rear horizontal support plate includes an apparatus restraining means, wherein said apparatus restraining means is defined as a plurality of deformable tabs formed integral to said rear horizontal support plate along an upper straight edge portion thereof, said deformable tabs extend to a first position.

2. The conduit support apparatus of claim 1, wherein said first position is defined as longitudinal in a direction distal to said rear vertical edge member and planar with said rear horizontal support plate.

3. The conduit support apparatus of claim 1, wherein said deformable tabs are adapted to be deformed from said first position to a second position.

4. The conduit support apparatus of claim 3, wherein said second position is defined as perpendicular to said upper surface of said rear horizontal support plate, said deformable tabs and said rear horizontal support plate are disposed at a right angle when said deformable tabs are deformed to said second position.

5. The conduit support apparatus of claim 1, wherein each of said plurality of deformable tabs includes an upper surface and a lower surface, said lower surface is adapted to snugly contact an outer surface of the first longitudinal wall of the masonry block, thereby facilitating securement of said conduit support apparatus atop the masonry block.

6. The conduit support apparatus of claim 1, further comprising a plurality of bosses, said bosses integrally protrude perpendicularly from an outer sidewall of said rear vertical edge member, said rear horizontal support plate includes a first longitudinal straight edge and a second longitudinal straight edge, said bosses flank said first longitudinal straight edge and said second longitudinal straight edge of said rear horizontal support plate.

7. The conduit support apparatus of claim 6, wherein each boss of said plurality of bosses includes an anterior end and a posterior end, said anterior end tapers substantially toward said posterior end so as to form a pointed tip, said pointed tip is adapted to frictionally engage an inner surface of a first longitudinal wall within a hollow cavity of a masonry block so as to secure said conduit support apparatus there against via mechanical interference.

8. The conduit support apparatus of claim 1, wherein said planar plate is adapted to reside in a slightly recessed position within a hollow cavity of a masonry block in a manner such that said planar plate is positioned just below an upper surface of the masonry block.

9. The conduit support apparatus of claim 1, wherein each of said alignment apertures is sized and dimensioned to accommodate an electrical conduit.

10. The conduit support apparatus of claim 1, wherein said main body is constructed from a suitably-rigid, deformable material.

11. The conduit support apparatus of claim 1, wherein said apparatus restraining means is defined as a plurality of tabs molded integral to said rear horizontal support plate, and wherein said tabs extend perpendicularly with respect to said upper surface of said rear horizontal support plate.

12. The conduit support apparatus of claim 1, wherein said left vertical edge member includes an upper surface from which a first horizontal support plate extends perpendicularly therefrom a longitudinal distance, said left vertical edge member and said first horizontal support plate are disposed at a right angle, end wherein said left vertical edge member having an outer surface adapted to be snugly engaged against an inner surface of a vertical wall of a masonry block.

13. The conduit support apparatus of claim 1, wherein said right vertical edge member includes an upper surface from which a second horizontal support plate extends perpendicularly therefrom a longitudinal distance, said right vertical edge member and said second horizontal support plate are disposed at a right angle, and wherein said right vertical edge member having an outer surface adapted to be snugly engaged against an inner surface of a vertical wall of the masonry block.

14. The conduit support apparatus of claim 12, wherein said first horizontal support plate is defined generally as having a smooth, rectangular configuration with an upper surface and a lower surface, wherein said lower surface functions as a masonry block contacting surface, said lower surface is adapted to be snugly engaged against an upper surface of the vertical wall of the masonry block.

15. The conduit support apparatus of claim 13, wherein said second horizontal support plate is defined generally as having a smooth, rectangular configuration with an upper surface and a lower surface, wherein said lower surface functions as a masonry block contacting surface, said second horizontal support plate extends oppositionally with respect to said first horizontal support plate, said lower surface is adapted to be snugly engaged against an upper surface of the vertical wall of the masonry block.

16. The conduit support apparatus of claim 1, wherein said rear horizontal support plate is defined generally as having a smooth, rectangular configuration with an upper surface and a lower surface, wherein said lower surface functions as a masonry block contacting surface, said rear horizontal support plate extends distally to said alignment apertures, said lower surface is adapted to be snugly engaged against an upper surface of a first longitudinal wall of the masonry block.

* * * * *